Aug. 20, 1957 — O. W. RANDOLPH — 2,803,545
DEHYDRATION
Filed Feb. 4, 1954 — 2 Sheets-Sheet 1
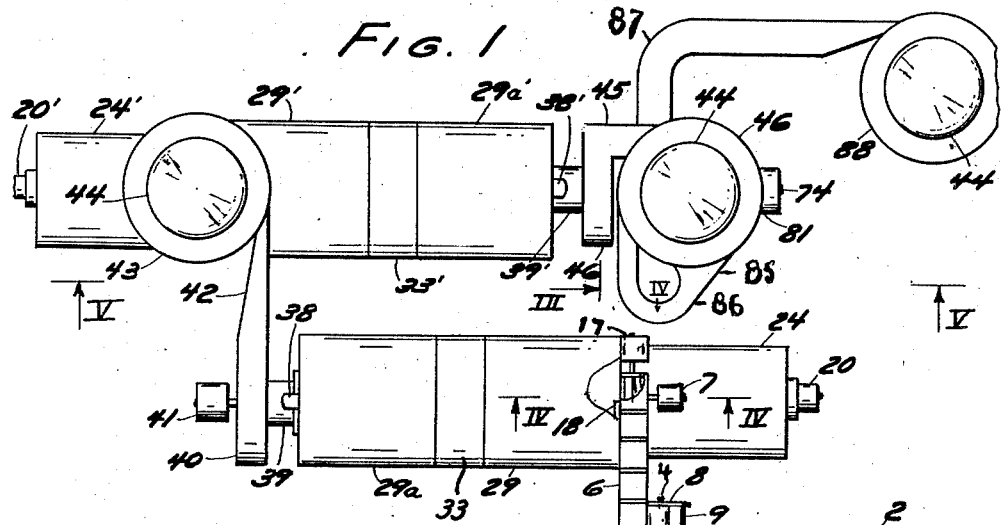
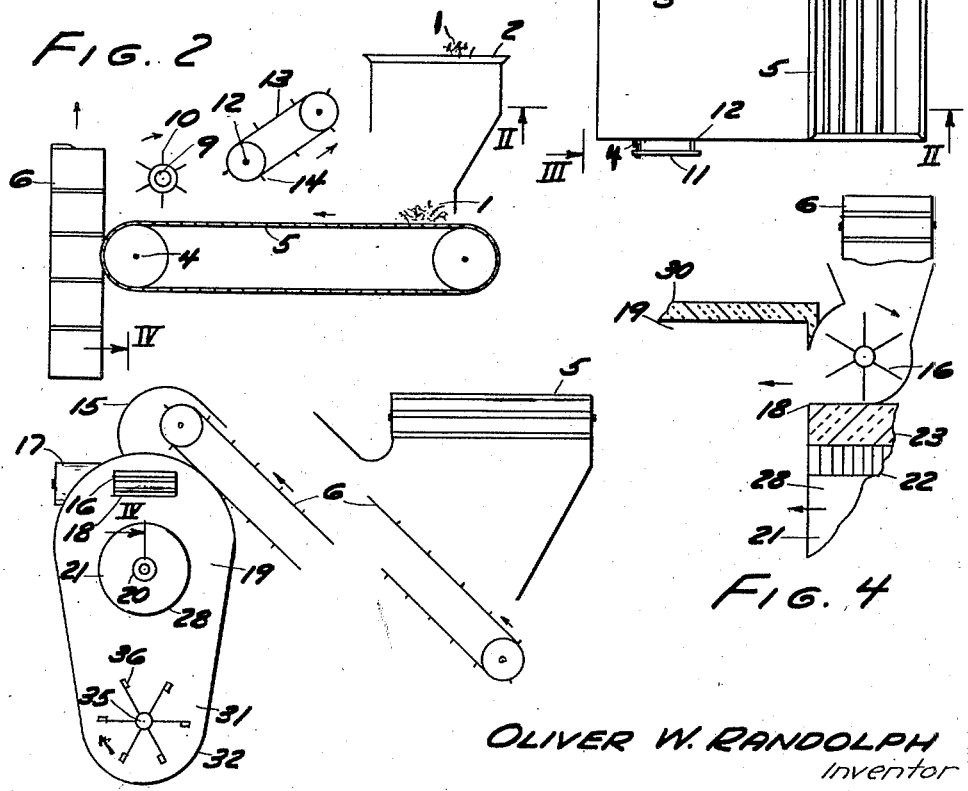
OLIVER W. RANDOLPH
Inventor
Atty.

Aug. 20, 1957 — O. W. RANDOLPH — 2,803,545
DEHYDRATION
Filed Feb. 4, 1954 — 2 Sheets-Sheet 2
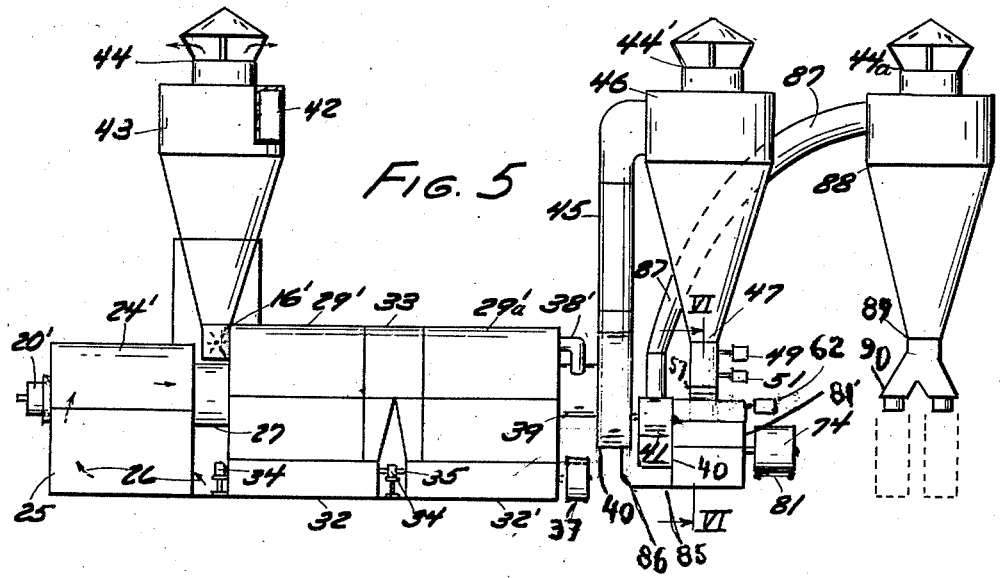
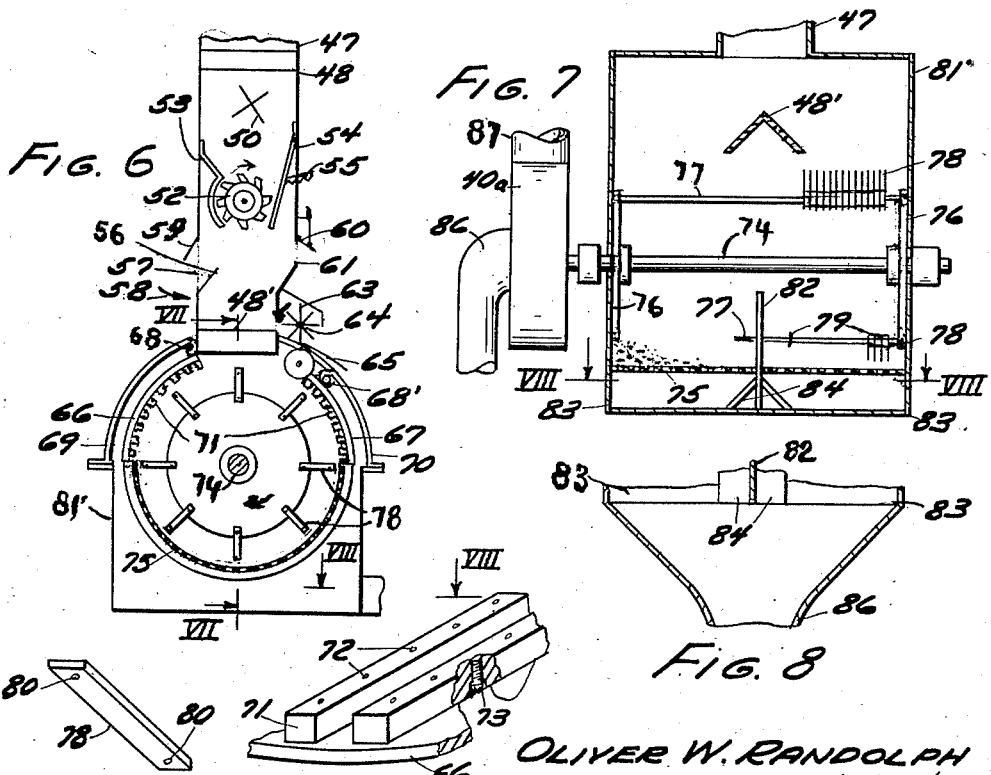
Oliver W. Randolph, Inventor United States Patent Office 2,803,545
Patented Aug. 20, 1957

2,803,545
DEHYDRATION

Oliver W. Randolph, Toledo, Ohio, assignor, by mesne assignments, to A. T. Ferrell & Co., Saginaw, Mich., a corporation of Michigan Application February 4, 1954, Serial No. 408,275

5 Claims. (Cl. 99—8)

This invention relates to a system of dehydration of vegetable material. More particularly it deals with a process and apparatus for dehydrating vegetation, such as alfalfa hay, immediately after it is harvested when it still may have a moisture content of 75% or more.

It is an object of this invention to dehydrate vegetable material in a simple, direct, efficient, complete, effective and economic manner to produce a standarized bulk food, such as for cattle.

It is another object of this invention to dehydrate vegetation in such a manner that the maximum vitamin value content is retained therein.

Another object is to produce a dehydrated vegetable food of fine homogeneous and uniform particles which is appetizing as an animal feed and is adaptable to be stable for extended periods of storage.

Generally speaking, the system of this invention comprises thoroughly co-mingling vegetation material with two separate streams of hot combustion gases in two successive stages. These streams of combustion gases are sufficiently hot to effect approximate instantaneous leaf withering of the leafy portions of the vegetation by removing the water or moisture vapor from them at a rate sufficient to quench any tendency for their combustion. The heat of these gases also simultaneously comminutes the leafy particles so they remain in suspension in the hot gas streams, while the heavier particles such as the stems, fall into an agitator where they are mechanically comminuted and thrown back into the stream of hot gases with the suspended leafy particles. The introduction of the vegetation into the hot gas streams is accomplished in both stages by a means to project the material parallel to and above the hot gas streams, so that the streams will keep in suspension as much of the particles of the vegetation as possible and thereby convey the particles through the apparatus. At the end of each of the two successive heat treating stages, the excess combustion gases are separated from the particles, such as in cyclone separators, before they are further treated including their introduction into the second fresh hot combustion gas stream. After the particles have been dried in the two successive stages, they may be further divided, co-mingled and/or separated as desired, including treatment in a hammermill. The system of this invention may be arranged to be substantially continuous and may include special feeding means for distributing intermittent truck loads of vegetation.

The above mentioned and other features and objects of this invention and the manner of obtaining them will become more apparent and the invention itself will be best understood by reference to the following description of an embodiment of the invention taken in conjunction with the accompanying drawings, wherein:

Fig. 1 is a schematic plan view of a specific installation of the dehydration apparatus of this invention for receiving fresh three and four inch length cuttings of a chopped forage crop material as it comes directly from a field.

Fig. 2 is a schematic sectional view taken along line II—II of Fig. 1 in the direction of the arrows, showing part of the foliage distribution apparatus for feeding the treating equipment of this invention;

Fig. 3 is a schematic section taken along line III—III of Fig. 1 in the direction of the arrows, showing left end of the distribution and feeding apparatus of Fig. 2 and a vertical section through one end of the first drying section or chamber of the treating equipment;

Fig. 4 is a schematic vertical sectional view taken along line IV—IV of Figs. 1 and 3 in the direction of the arrows, showing the kicker for projecting the material into the first drying chamber or section above and parallel to the hot combustion gases projected into that chamber;

Fig. 5 is a side elevation of the second part of treating equipment shown in Fig. 1 taken along line V—V in the direction of the arrows, showing the third and fourth heat treating chambers or sections and spacer between them, as well as the cyclone gas separators and a hammermill as a final treating stage;

Fig. 6 is a schematic vertical section taken along line VI—VI of Fig. 5 in the direction of the arrows, showing a rotary valve and particle discharging means and a specific type of hammermill;

Fig. 7 is a vertical section taken along line VII—VII of Fig. 6 in the direction of the arrows showing the hammermill with parts thereof being broken away;

Fig. 8 is a partial horizontal section taken along line VIII—VIII of the discharge ducts at the bottom of the hammermill of Figs. 6 and 7;

Fig. 9 is an enlarged perspective view of two adjacent material impact-receiving breaker bars mountable for orienting and replacement in the hammermill of Fig. 6 with parts thereof being broken away; and Fig. 10 is an enlarged perspective view of a freely swingable reversible mountable hammer for the hammermill shown in Figs. 6 and 7.

From afield there may be brought in freshly cut or harvested vegetation, as a forage crop fresh or green cuttings 1 (Fig. 2), say of alfalfa, such being chopped up or in lengths running under 4" long. The material 1 to be treated as conveyed by a truck is dumped into a receiver or hopper 2 (Figs. 1, 2). A motor 3 (Fig. 1) has control-of-speed connection to a shaft 4 actuating an endless conveyor 5 providing a movable floor or bottom extending from the chute or hopper 2 to an elevator or flight carrying type of conveyor 6 actuated at a predetermined speed by a motor 7 to regulate the amount of material fed into the treating equipment.

From the motor 3 is a transmission connection 8 to a shaft (Fig. 2) having thereon a high-speed rotation kicker or thrower 10, acting to swish off the traveling floor 5 the pregauged thickness, of say ½" of chopped alfalfa 1 thereon, so as to have such material well distributed when it falls onto the elevator 6 in its upward course. From the shaft 4 (Fig. 1) is a transmission 11 to a shaft 12 operating upwardly inclined lower reach of an endless belt device 13 (Fig. 2) having flights or kickers 14, effective to skim back along the floor 5 reversely to its travel direction, surplus of the choppings 1 as may be in excess of the set thickness of the material to be passed to the throwing device 10. Thus there may be husbanded in the hopper 2 sufficient material 1 for continuity of uniform feeder supply by the elevator 6, even between truck loads, as well as to cover intermissions in such deliveries.

A hood or housing 15 (Fig. 3) directs discharge of the choppings 1 from the upper end of the elevator 6 to fall on a kicker or throwing means 16 (Fig. 4) driven at a high speed by a motor 17 (Figs. 1, 3). The bulk material fragments 1 are thus projected thru a window or horizontally directed material supply port 18 as a suspension scattering into upper zone or region 19 of the first drying chamber (Fig. 4).

A furnace, as for gas or oil may have a burner 20 or 20' (Figs. 1, 5) operating in a combustion chamber 21 (Fig. 4) having a firebrick lining 22 (Fig. 4) in a heat insulation jacket 23 (Fig. 4) assembled as a furnace unit 24 or 24' (Figs. 1, 5) having a base section 25 (Fig. 5) for air draft 26 (Fig. 5) intake to its burner 20' shown in Fig. 1 or burner 20 shown in Fig. 5.

The furnace unit 24 or 24' (Figs 1, 5) has a duct forming passage or connection 27 (Fig. 5) locating the combustion chamber which has therefrom a horizontally directed gas supply discharge port 28 (see Fig. 3 and 4) which provides a particle suspension medium of moving heated gases active in the zones 19 (Fig. 4) of the body or the housing or chamber sections 29 or 29' (Figs. 1 and 5) of the particle comminution type of dryer or centrifugally throwing beater or mill of this present invention. Each of the combustion chambers 21 have a discharge comminution way, open end or port 28 through which hot gas travels from the furnaces 24, 24' into the dryer zones 19 of the first and third drying housings or sections 29 and 29'. In these dryers the hot gases are effective in vaporizing the moisture out of the wet vegetation or organic material which is held in suspension in the hot combustion gases and is reduced to particles which are co-mingled longitudinally and transversely with the gas stream by beaters 36 provided in the lower portion 31 of each of the drying chambers or sections 29, 29a, 29', and 29a' (Fig. 1). In order to minimize heat loss throughout the multi-sections of the dryer of this installation, an insulation jacket 30 (Fig. 4) is provided around each of the sections 29, 29a, 29', and 29a'. The dryer or dehydrator zones 19 (Figs. 3, 4) have downward therefrom sub-zones or lower chamber portions 31 (Fig. 3) in the lower base sections 32 and 32' (as shown in Fig. 5 below sections 29' and 29a'). Splicers or spacer sections 33 and 33' (Figs. 1 and 5) provide continuity for the zones 19 of each of the sections 29, 29a, 29' 29a', respectively, as well as acting as means to direct upwardly the material from their lower portions 31 into the upper zone or portion 19 of the following section for further co-mingling with the gases and material in that zone 19. The clearance between the lower portions of the sections 29—29a and 29'—29a' (Fig. 5) provides space for between-section bearings 34 to mount shaft 35 to carry the high speed rotating kickers, fans, or comminuting members 36 in the bottom of each of the chambers (Fig. 3) actuated by the motor 37 (Fig. 5).

Considering the material 1 as short cuttings of alfalfa, there is considerable leaf volume on the short stem sections. There is high protein value in the leaf particles, which, as thrown by the impeller or kicker 16, have suspension augmented by the high draft rate of the furnace discharge, which discharge draft may have a temperature in the zone 19 even up to 1250° to 1800° F. The high moisture initial content of the forage may be in the range of 70% to 80%. The moisture is quickly converted to steam in such dominance as to squelch or blanket combustion action on the forage, with the withered unscorched leaves retaining normal approach to green color and high vitamin values. The lightness or low specific gravity for the leafy portions results in it being retained in suspension and in its course along the upper portion of the first zones 19', through the first connector or spacer 33 and continued with high course flow through the succeeding zone 19 to a first, take-off duct 38 (Fig. 1).

The stems or fibrous portions of the forage crop do not release the moisture quite so readily as the leafy portions. Accordingly such are heavier or are of greater specific gravity, and not quite so readily retained in high suspension in the zones 19 (Figs. 3, 4). Any tendency to settle out, or descend into the zones 31 is counteracted by the fans 36, supplementing the kicking with some beating to thereby promote breaking or subdividing of the fiber.

As the vegetation material and fibers of the stems are subjected to drying, comminuting, and general reduction in dimensions, their relative surface areas are correspondingly increased so that the high temperature combustion gases with which they are co-mingled correspondingly extract more moisture from the vegetation particles. Furthermore, the air intakes 26 to each of the furnaces 24 and 24' are regulated so that no large excess of unburned air is present in the hot combustion gases which are directed through port 28 from the furnace. These completely burned gases, plus the stream produced from the moisture which was present in the now dried vegetation, prevents any combustion in the drying chambers from taking place, since the percentage of steam present in the drying chambers including superheated steam, is comparatively great.

Upon the basis of green forage carrying close to 80% moisture and supplied to the dehydrator at the rate of say 100# per min. take off at 50% per min. moisture at a section 39 or 39' (Figs. 1,5) from the region of lower portion of the zone 19 (Fig. 3), means that the moisture content is brought down close to 40%.

While the fans 36 have from the beating actions a measure of breaking up or subdividing in promoting the drying, the explosion approaching action of imparting above-boiling temperature to the moisture-carrying material has effected so-called flash-boiler action for spontaneous steam generation in clearing the more-readily released moisture from the forage, with resulting shatterings of leaf and even stem forms. Accordingly there is very material subdivision toward fines from the 4" cuttings of the supply to the hopper 2.

The first section 39 (Fig. 1) is an axial supply or intake to a blower or centrifugal fan 40 actuated by a motor 41. The section 39 has its intake draft from the chamber zone 19 of the second dryer 29a of such velocity as to act as an induced draft device in promoting mixing intake therewith of flow from the take-off duct 38. There is thus an automatic mixing of the leafy fines and the stem subdividings for upflow transfer by the fan 40 by way of a duct 42 to a cyclone separator or dust-collector 43 (Figs. 1, 5, at the left). As there may be some pressure build-up from the generated steam in moisture extraction, with possibly some dilution from products of combustion, flow-off 44 is provided therefor from the cyclone 43.

The particles, separated from the vapor and gas portions by the cyclone 43, are delivered directly to a second impeller or projector 16' (Fig. 5) between the furnace 24' and the third dryer 29' which kicks such fines into the upper chamber zone 19 of the third dryer comminutor or drying section 29', wherein a second furnace 24' provides heat source for the third and fourth dryer chamber portions 29' and 29a. The finer and lighter particles are more rapidly carried through the third and fourth sections 29' and 29a', in their upper zones 19 (Fig. 3); with the less light or heavier particles tending to settle or work toward the lower zones 31, with the up-throwing action of the fans 36 effecting further subdivision as the re-supplied high temperature combustion gases have effected further moisture removal attack on the greatly increased surfaces of the further divided particles. Current practice as herein disclosed brings the moisture content down to the range of 8% where the second section 39' (Figs. 1,5) induces fines flow from the second take-off duct 38 to intake to the second blower or fan 40 for up-draft duct 45 to deliver to a second cyclone dust collector 46 having a vapor discharge 44'.

The cyclone 46, as the second vapor take-off device, has the fines therefrom pass by a down-passage 47 to be spread by an inverted V-baffle 48 (Fig. 6, upper portion). A motor 49 (Fig. 5) operates an agitator 50 (Fig. 6) in the down-passage 47 below the stream spreader V-device 48. A motor 51 (Fig. 5) drives a rotary valve type of feed device 52 (Fig. 6) having a shield chute fixed side way 53 at the up-rotation side for the rotor 52, and an adjustable chute-side leaf 54, adapted to be set at various clearances by the notched arm 55. The high speed of clockwise (Fig. 6) rotation for the valve 52 tends to throw any heavier or foreign matter to lodge on an incline 56 and pass out of a window 57 as detritus particles 58. A shield 59 for the window 57 tends to direct suction or in-draft across the incline 56 upper edge. An adjustable flap 60 at the opposite side is set to check suction or intake draft at a port 61. The supply from the second cyclone duct collector 46 of fines clear of foreign matter is now in course for further subdivision.

With the temperature of the material to the first cyclone 43 (Figs. 1, 5) in the range of up to 250° F. there may be approximately similar temperature for the fines at the second cyclone 46. The cyclone 43 has not brought down the temperature for the particles to the third and fourth comminutors en route to the second cyclone to disturb the initiated condition of vaporization brought into the equipment at the first comminutor. The continuity in the drying, say to 6½% moisture content, achieves what would not otherwise be possible due to the cooperative interaction for bringing rating in the range of 192,000 vitamin A in a food item carrying 19.1% fiber and 18.6% protein. There may be promoted further drop in temperature from outside air intake at the ports 57, 61, (Fig. 6) as the passage 47 delivers fines to fall on a lower or second inverted V-baffle 48' (Figs. 6, 7). There may be the divided direct flow therefrom to an abrader or hammermill for further promoting the exposed surface ratio in dehydrating efficiency. The fiber content is reduced by high speed throwing action of a motor 62 (Fig. 5) to direct more coarse thrown particles away from being delivered to the rotary mill, by causing such particles to lodge on wings 63 (Fig. 6) of this rotary valve device to be wiped from face 64 to pass to a chute 65.

For a mill there is provided a pair of concave plates or sections 66, 67 (Fig. 6). Adjacent the end of the underside of the baffle 48' at one end is a hinge 68 for an outer shield section 69 for the plate 66. Similarly adjacent the valve device 63 is a hinge 68' for a shield section 70 for the plate 67. The plates 66, 67, have junction with a semi-cylindrical lower screen or perforate section 75 in the range of say 16 openings per inch. Considering this drum or shell to be in the range of 29" long and 43" in diameter, the upper plates are set back slightly to have lengthwise thereon breaker bars 71 with radial holes 72 (Fig. 9) so that a plurality of bolts 73 thru the plates 66, 67, may mount these bars in parallel either side up or exposed. While with the device 63 (Fig. 6) designed for clockwise rotation, in the event such be omitted, there may be reversal of the direction when there is rotation of a shaft 74 coaxially of a screen 75. On the shaft 74 (Fig. 7) disks 76 have rods 77 on which are strung swing hammers or arms 78, spaced by washers 79. Holes 80 (Fig. 10) in opposite ends of the arms 78 permit reversal of the swing axis mounting for the arms on the rods 77.

At the clockwise direction of rotation for the shaft 74, the oblong rectangular or sharp corner-carrying arms 78 have the trailing clockwise direction corners swinging across the mesh screen 75 and toward the counter-clockwise corners of the parallel breaker bars 71. When there has not been use of the device 63, motor 81 (Fig. 5) to drive the shaft 74, may be reversible, thereby causing the slight wear-down of corners on the arms 78 and the bars 71 to be on the corners un-affected by the clockwise rotation of the shaft 74. This use is achieved without any shifting of the arms or bars as to the mountings therefor. The disclosure means that four ways are available for wear action, by changing ends for the swing mountings of the arms 78, and by orienting of the bars 71, to have the opposite sides thereof toward the plates 66, 67. In the handling of alfalfa type of forage, the arms 78 may be ⅛" thick, 1¾" wide, 5" long, with ³⁄₁₆" clearance as to the screen 75 and the bars 71, with the shaft 74 operating at 1750 R. P. M.

A housing 81 (Figs. 5, 7) for the hammermill has the inverted V-stream deflector 48' (Fig. 7) to direct the intake toward the ends of the mill chamber so that there is no piling up centrally, but such approximation of symmetry of action that the dulling of the corners from long continued use of the hammers and bars closely approaches uniformity, with resultant output increase with product character identity maintenance. The lengthwise spread across the hammermill working length is stabilized by lower half partition 82, providing mid-support for the screen 75 for similarity of particle passings therethru into a lower take-off section of two chamber portions 83 (Figs. 7, 8) with spread base walls 84 eliminating central eddy accumulations.

From the base portion of the housing 81' of the hammermill the chamber portions 83 have communication with an intake 85 (Fig. 5) to a duct 86 to a third fan or blower 40a. This blower is on the shaft 74 and induces fines that passes through the screen 75 of mill to be carried from the blower 40a by a duct 87.

Considering the finished product to be a feed material, the duct 87 is shown discharging into a third cyclone, herein cyclone separator 88 having vapor discharge 44a, effective under the practice as herein conducted to bring the meal or feed to a discharge 89 at a temperature of 80° or less with outdoor temperature in the range of 60° F. Storing may be thus had directly thru bagging device 90.

The particular instance given as to material handling, green freshly cut alfalfa in chopped up lengths in the range of 4" long, has been efficiently carried thru for up to two tons per hour of output or dried product meal in the general dimension disclosed. The furnaces 24 and 24' (Figs. 1, 5) may bring the combustion chamber 21 (Figs. 3, 4) temperature up to in the range of 2300° F. With 300 cu. ft. per min. into the first and third sections 29 and 29' (Figs. 1, 5) there is in the range of four or five fold more vapor volume discharge at the exit 44 from the cyclone 43, considering the sections is the range of 7' high and upward of 3' width for the zone 19, sections 29, 29a, 29', and 29a' each being about 8' long.

It is to be noted that subdividing is developed herein due to the flash supply of high temperature gas in thus exploding moisture from the forage, to an extent wilting or powdering the leafy portions, supplemented by the fan throwing to disintegrate the fiber portions. The second furnace heating stages carries further along in increasing the surface area, plus the hammermill taking on the still warm fines for completing conversion of the green forage into a finely subdivided fine meal food. Such quick carrying thru has been for the product to be in the range of 192,000 vitamin A rating at 8½% moisture, with 19.1% fiber and 18.6% protein.

While the bulk material taken into account more particularly herein has been forage crop, specifically alfalfa, range may be to inorganic material, as sand, marl, kaolin, meats, leaf and root crop vegetables, fruit, cereals, and mixtures. Values arise in the subdivision, in moisture removal to a standard for each, and the efficient carrying thru in the plural stage sequence. The hot blast action effects some structure shattering in vaporization, especially in reducing moisture. The subdivision experienced has been such that with sixteen mesh per inch for the hammermill screen 75, the material as of body to be taken off at the discharge 90 (Fig. 5) has fines appropriate for grading as passing twenty mesh to the inch. The dehydration as disclosed promotes subdivision action. With leafy vegetation, the leaf-withering heat forthwith carries thru light fines in suspension. The fully ignited combustion vapors do not supply further combustion supporting atmosphere. While there may be excess of air supply, the moisture vapors effectively quench ignition of the material undergoing treatment, even tho such in itself is readily combustible in a normal atmosphere.

The feeder means is the effective kicker or horizontal throwers 16 and 16' (Figs. 3, 4). The treating means initially is the chamber, shown in sections, 29, 29a, 29', and 29a' (Figs. 1, 5) with suspension zones 19 (Figs. 3, 4). The vapor dilution means is the combustion gas or vapor supply 28 (Figs. 3, 4) from each furnace 24 and 24'. The fans 36 (Fig. 3), as well as the hammermill arms 78 (Figs. 7, 10), are rotary material throwing members.

The cyclones or separator means 43, 46 (Fig. 1, 5), take off moisture vapor and products of combustion, with some temperature drop thereby controlled for delivery to the hammermill 81' (Figs. 5, 7). Vapor for suspension as well as bringing the product down to desired cooling is cared for at the windows 57, 61 (Fig. 6), in the downchute 47 from the cyclone 46 (Fig. 5). This cooling air dilution is removed by the cyclone 88 as the stage for material fines body product. The stems are the more coarse material in the sequence herein before reaching the mill 81' (Figs. 5, 7).

What is claimed and it is desired to secure by Letters Patent is:

1. A dehydration process for stem-carried leafy vegetation comprising: a horizontally directing draft of combustion vapor, horizontally directing vegetation particles to be taken on for suspension action in the direction of the draft and by the draft, said draft having a temperature sufficient to effect approximate instantaneous leaf withering of the leafy particles of the vegetation by removing their moisture vapor at a rate sufficient to quench any tendency for combustion of the particles during said suspension thereby also developing fine subdivided particles from the leaves, maintaining suspension of the stems in the draft by agitating and successively throwing them upwardly to promote their subdivision whereby said throwings of the stem particles are transverse to the relative general longitudinal progress of all the particles during their drying, said successive transverse throwings making the stem particles more fragile and developing them into more finely divided particles to approach a homogeneous product when co-mingling with the leafy particles, said process including, intermediate of at least two transverse throwings, the taking off of vapor from said draft followed by the introduction of more combustion draft horizontally with the movement of the particles.

2. A process according to claim 1 including the initial step of regulating the quantity of vegetation particles directed into said draft.

3. A process according to claim 1 including separating foreign material from the final resulting vapor separated material particles.

4. A process according to claim 1 including an additional step of further comminuting the final resulting dehydrated and vapor separated material particles.

5. A process according to claim 4 including separating foreign material from the resulting dehydrated vapor separated material before it is further comminuted.

References Cited in the file of this patent

UNITED STATES PATENTS

| | | |
|---|---|---|
| 676,165 | Wacker | June 11, 1901 |
| 1,421,283 | Meakin | June 27, 1922 |
| 1,988,677 | Arnold | Jan. 22, 1935 |
| 2,067,506 | Silva | Jan. 12, 1937 |
| 2,069,873 | Cheneult | Feb. 9, 1937 |
| 2,236,006 | Mulvany | Mar. 25, 1941 |
| 2,241,654 | Arnold | May 13, 1941 |
| 2,488,653 | Andree et al. | Nov. 22, 1949 |
| 2,558,107 | Smith | June 26, 1951 |
| 2,588,865 | Moldenhauer | Mar. 11, 1952 |
| 2,661,160 | Keiper | Dec. 1, 1953 |
| 2,682,374 | Rietz | June 29, 1954 |